United States Patent [19]

Cassidy et al.

[11] Patent Number: 4,866,103
[45] Date of Patent: Sep. 12, 1989

[54] POLYISOCYANATE COMPOSITIONS

[75] Inventors: Edward F. Cassidy, Ukkel; Herbert R. Gillis, Sterrebeek; Jan W. Leenslag, Neerijse; Alain Parfondry, Evere, all of Belgium

[73] Assignees: ICI Americas Inc., Wilmington, Del.; Imperial Chemical Industries PLC, London, United Kingdom

[21] Appl. No.: 246,128

[22] Filed: Sep. 16, 1988

[30] Foreign Application Priority Data

Oct. 16, 1987 [GB] United Kingdom ............... 8724348
Sep. 9, 1988 [GB] United Kingdom ............... 8821186

[51] Int. Cl.$^4$ .............................................. C08G 18/14
[52] U.S. Cl. .................................... 521/159; 528/44;
  528/60; 528/61; 528/64; 528/65; 528/66;
  528/76; 528/77; 528/83; 528/85
[58] Field of Search ............... 521/159; 528/44, 60,
  528/61, 64, 65, 66, 76, 77, 83, 85

[56] References Cited

U.S. PATENT DOCUMENTS 4,786,703 11/1988 Starner et al. .................... 528/63

FOREIGN PATENT DOCUMENTS 0225640 6/1916 European Pat. Off.
0046088 2/1982 European Pat. Off.
0093334 11/1983 European Pat. Off.
0132290 1/1985 European Pat. Off.
WO86/05795 10/1986 PCT Int'l Appl.

OTHER PUBLICATIONS

English Abstract of EPA 0093334, 4/83.

Primary Examiner—Maurice J. Welsh
Attorney, Agent, or Firm—James T. Jones

[57] ABSTRACT

A polyisocyanate composition, suitable for use in the production of elastomers by the RIM process, said composition being the product of reacting an alcohol and/or thiol having an average hydroxyl and/or thiol functionality of from about 1.5 to about 4 and an average hydroxyl and/or thiol equivalent weight of at least 500 with at least 2 equivalents, per hydroxyl and/or thiol equivalent, of an organic polyisocyanate under such conditions that at least about 20% of the initially formed urethane and/or thiourethane groups are converted to allophanate and/or thioallophanate groups.

17 Claims, No Drawings

POLYISOCYANATE COMPOSITIONS

This invention relates to polyisocyanate compositions useful in the production of mouldings by the reaction injection moulding process and in the production of foams and to reaction systems containing said compositions.

One of the more important methods of making isocyanate based cellular or non-cellular elastomers is the technique known as reaction injection moulding (RIM) whereby two highly reactive liquid streams are impingement mixed and rapidly injected into a mould cavity. The two streams generally comprise a polyisocyanate or derivative thereof, usually known as the "A" component, and an isocyanate reactive stream, known as the "B" component, commonly containing polyol and/or polyamine reactants.

It has now been found that allophanate-modified isocyanate-terminated prepolymers are useful in the production of RIM elastomers and can be processed on conventional equipment to give elastomers having a high level of physical properties. The prepolymers are also useful in the production of foams.

Accordingly, the present invention provides a polyisocyanate composition which is the product of reacting an alcohol and/or thiol having an average hydroxyl and/or thiol functionality of from about 1.5 to about 4 and an average hydroxyl and/or thiol equivalent weight of at least 500 with at least 2 equivalents, per hydroxyl and/or thiol equivalent, of an organic polyisocyanate under such conditions that at least about 20% of the initially formed urethane and/or thiourethane groups are converted to allophanate and/or thioallophanate groups.

Unless otherwise stated, the expressions "equivalent weight" and "molecular weight" as used throughout the present specification refer to the equivalent weight values as may be calculated by measuring the content of functional groups per weight of polymer sample and to the molecular weight values as may be calculated from the thus obtained equivalent weight and the theoretical functionality of the polymers.

The polyisocyanate compositions of the invention may be regarded as allophanate polyisocyanates in which a significant proportion of the isocyanate groups are present in terminal groups of the formula:

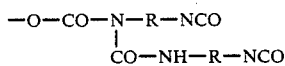

(1)

wherein R represents a divalent hydrocarbon radical, for example a methylene-bis-phenylene radical.

Especially useful polyisocyanate compositions contain at least two groups of Formula 1 separated one from another by a chain of more than 70 atoms, preferably more than 100 atoms.

In this connection, references to the number of atoms in a chain indicate the number of atoms present in the backbone of a chain but not hydrogen atoms or other substituents attached to backbone atoms. Thus, in a poly(propylene oxide) chain, the carbon and oxygen atoms constituting the backbone of the chain are counted but not the attached hydrogen atoms or the atoms present in the methyl substituents.

Organic polyisocyanates which may be used in the preparation of the polyisocyanate compositions of the invention include aliphatic, cycloaliphatic and araliphatic polyisocyanates, for example hexamethylene diisocyanate, isophorone diisocyanate, cyclohexane-1,4-diisocyanate, dicyclohexylmethane-4,4-diisocyanate and p-xylylene diisocyanate. The preferred polyisocyanates, however, are the aromatic polyisocyanates, for example phenylene diisocyanates, tolylene diisocyanates, 1,5-naphthylene diisocyanate and especially the available MDI isomers, that is to say 4,4'-diphenylmethane diisocyanate, 2,4'-diphenylmethane diisocyanate and mixtures thereof. Whilst diisocyanates are the preferred polyisocyanates for use in the preparation of the polyisocyanate compositions, mixtures of diisocyanates with minor proportions of higher functionality polyisocyanates may be used if desired. Thus, MDI variants such as uretonimine-modified MDI may be used.

Alcohols and thiols which may be used in the preparation of the polyisocyanate compositions of the invention include polymeric polyols and polythiols and mixtures thereof and mixtures with monohydric alcohols and/or thiols, such mixtures having overall average functionalities and equivalent weights as defined above.

The preferred starting materials for use in the preparation of the polyisocyanate compositions are polymeric polyols having average nominal hydroxyl functionalities of from 2 to 5 and average hydroxyl equivalent weights in the range 500 to 5000. Particularly preferred polymeric polyols have average nominal hydroxyl functionalities of 2 or 3 and average hydroxyl equivalent weights in the range from about 1000 to about 3000. Suitable polyols and methods for their preparation have been fully described in the prior art and, as examples of such polyols, there may be mentioned polyesters, polyesteramides, polythioethers, polycarbonates, polyacetals, polyolefins, polysiloxanes and, especially, polyethers.

Polyether polyols which may be used include products obtained by the polymerization of a cyclic oxide, for example ethylene oxide, propylene oxide or tetrahydrofuran in the presence, where necessary, of polyfunctional initiators. Suitable initiator compounds contain a plurality of active hydrogen atoms and include water and polyols, for example ethylene glycol, propylene glycol, diethylene glycol, cyclohexane dimethanol, resorcinol, bisphenol A, glycerol, trimethylolpropane, 1,2,6-hexanetriol or pentaerythritol. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Mixtures of the said diols and triols can be particularly useful. Other useful polyether polyols include polytetramethylene glycols obtained by the polymerisation of tetrahydrofuran.

Polyester polyols which may be used include hydroxyl-terminated reaction products of polyhydric alcohols such a ethylene glycol, propylene glycol, diethylene glycol, 1,4-butanediol, bis(hydroxyethyl) terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof.

Polyesteramides may be obtained by the inclusion of aminoalcohols such as ethanolamine in polyesterification mixtures. Polyesters obtained by the polymerisation of lactones, for example caprolactone, in conjunction with a polyol, may also be used.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo- and copolymers and suitable polysiloxane polyols include polydimethylsiloxane diols and triols.

In preparing the polyisocyanate compositions, the polyisocyanate and the alcohol or thiol may be reacted together using conditions that have been fully described in the prior art for the production of urethane prepolymers. Thus, one or more polyisocyanates may be reacted with one or more polyols under substantially anhydrous conditions at temperatures between about 50° and about 110° C., optionally in the presence of catalysts, until the formation of urethane groups by reaction between the isocyanate groups and the hydroxyl groups is substantially complete. Reaction between the urethane groups and the excess of polyisocyanate is then allowed to take place so that at least about 20%, preferably at least 50%, and optionally up to 100% of the initially formed urethane groups are converted to allophanate groups. The conversion of urethane groups to allophanate groups may be assisted by catalysts. Suitable catalysts are known in the polyurethane art and include tin compounds such as dibutyltin dilaurate and sulphonic acids. It is preferable to avoid those catalysts which under the conditions of prepolymer formation, promote competing isocyanate reactions such as trimerisation.

In preparing the polyisocyanate compositions, the polyisocyanate and the alcohol or thiol are suitably reacted in such proportion that the initial NCO/OH is at least about 2:1, preferably greater than about 5:1.

One convenient method of preparing the compositions involves adding the alcohol or thiol gradually to the total amount of organic polyisocyanate so as to minimise chain extension.

The polyisocyanate compositions of the invention are of particular value in the production of moulded elastomers by the RIM technique, the compositions being reacted as "A" components, optionally in conjunction with other polyisocyanates or variants thereof, with suitable "B" components, that is to say isocyanate-reactive materials. Thus, in a further aspect of the present invention, there is provided a reaction system for use in making a reaction injection moulded elastomer, said system comprising the following components:

(A) a polyisocyanate composition which is the product of reacting an alcohol and/or thiol having an average hydroxyl and/or thiol functionality of from about 1.5 to about 4 and an average hydroxyl and/or thiol equivalent weight of at least 500 with at least 2 equivalents, per hydroxyl and/or thiol equivalent, of an organic polyisocyanate under such conditions that at least about 20% of the initially formed urethane and/or thiourethane groups are converted to allophanate and/or thioallophanate groups, and (B) an isocyanate-reactive component.

Component B of the reaction systems of the invention, the isocyanate-reactive component, may contain the usual ingredients of such components, for example soft block components, chain extenders and mixtures thereof. Typical soft block components include polyols, polyamines, iminofunctional compounds, enamine-containing compounds and mixtures thereof having equivalent weights of at least 500, preferably at least 750, whilst typical chain extenders include compounds of the same classes having equivalent weights below 500.

Polyols having equivalent weights of at least 500 which may be present in Component B include the polymeric polyols described above in relation to the preparation of the polyisocyanate composition. Preferred polyols include the above mentioned polyoxypropylene and poly(oxyethyleneoxypropylene) diols and triols and mixtures thereof.

Polyamines having equivalent weights of at least 500 which may be present in Component B include amino-terminated polythioethers, polyesters, polyesteramides, polycarbonates, polyacetals, polyolefins, polysiloxanes and, especially, polyethers. Polyether polyamines which may be used include products obtained by the reductive amination of polyether polyols as described, for example, in U.S. Pat. No. 3,654,370, or by the cyanoethylation of polyols followed by hydrogenation, Polyoxypropylene and poly(oxyethyleneoxypropylene) diamines and triamines and mixtures thereof are preferred. Preferred equivalent weights are in the range from 500 to 5000, especially about 1000 to about 3000.

Imino-functional compounds which may be present in Component B are imino-functional compounds capable of reacting directly with polyisocyanates without prior cleavage of the C=N bond to form a monomeric byproduct. Suitable imino-functional compounds include imino-functional polyether resins having molecular weights of at least 1000, preferably 2000 to 8000 and an average imino functionality of at least 1, preferably from about 2 to about 4.

"Imino-functional" as used herein means that a reactant contains the grouping:

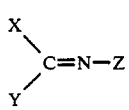

wherein X, Y and Z are chemical moieties which collectively form the rest of said compound and are each independently selected from hydrogen and organic radicals which are attached to the imino unit:

of said compound through N, C, O, S, Si or P, the central carbon atom of said imino unit being bonded to three atoms. In the above structure, neither the carbon nor the nitrogen atom of the imino unit should be incorporated within an aromatic or other fully conjugated ring or ring system. It is preferred that Z is attached to the imino unit through carbon and that X and Y are independently H or organic radicals attached through C, N or O. It is most preferred that X Y and Z are attached through saturated atoms, preferably aliphatic carbon atoms.

The range of imino functional reagents which may be used in the invention is not limited by or to any particular chemistry for the preparation of said reagents. For example, imine terminated aliphatic polyethers may be made by a number of different routes. Specifically, the amine groups ($-NH_2$) of an aliphatic amine-terminated polyether can be prereacted with an aldehyde ($RCH_2CHO$) or a ketone ($R^1-CO-R^2$) to form, respectively, the corresponding aldimine $-N=CHCH_2R$ or the corresponding ketimine

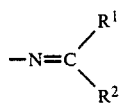

wherein R, $R^1$, and $R^2$ are hereinafter defined, or the aldehyde and/or ketone groups, of an aldehyde and/or ketone-terminated polyether, can be prereacted with an aliphatic primary mono-amine to form, respectively, the corresponding aldimine and/or ketimine-terminated polyethers:

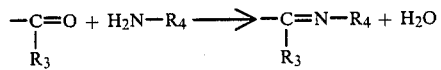

wherein: $R_3=$H or alkyl, $R_4=$H or alkyl. Many types of imino-functional compounds are useful in this invention, including (but not limited to) those listed in Table A, following:

TABLE A

| TYPE | |
|---|---|
| ⓟ $-R^5-C=N-R^7$<br>   $\quad\quad\quad\;\;\; |$<br>   $\quad\quad\quad\;\;\; R^6$ | Simple imine |
| ⓟ $-R^5-O-C=N-R^7$<br>   $\quad\quad\quad\quad\quad\;\; |$<br>   $\quad\quad\quad\quad\quad\;\; R^6$ | Imino ester |
| ⓟ $-Ar-O-C=N-R^7$<br>   $\quad\quad\quad\quad\quad\;\; |$<br>   $\quad\quad\quad\quad\quad\;\; R^6$ | Imino ester (aromatic) |
| ⓟ $-R^5-N=C\begin{subarray}{l}R^6\\R^7\end{subarray}$ | Simple imine |
| ⓟ $-R^5-NR^6-C=N-R^8$<br>   $\quad\quad\quad\quad\quad\;\; |$<br>   $\quad\quad\quad\quad\quad\;\; R^7$ | Amidine |
| ⓟ $-R^5-N=C\begin{subarray}{l}R^6\\Ar'\end{subarray}$ | Simple imine (aromatic) |
| ⓟ $-R^5-NR^6-C=N-Ar'$<br>   $\quad\quad\quad\quad\quad\;\; |$<br>   $\quad\quad\quad\quad\quad\;\; R^7$ | Amidine (aromatic) |

TABLE A-continued

| TYPE | |
|---|---|
| ⓟ $-R^5-C=N-R^6$<br>   $\quad\quad\quad\;\;\; |$<br>   $\quad\quad\quad\;\;\; OR^7$ | Imino ester (aliphatic) |
| ⓟ $-R^5-C=N-R^6$<br>   $\quad\quad\quad\;\;\; |$<br>   $\quad\quad\quad\;\;\; OAr'$ | Imino ester (aromatic) |
| ⓟ $-R^5-NH-C=NR^6$<br>   $\quad\quad\quad\quad\quad\;\; |$<br>   $\quad\quad\quad\quad\quad\;\; NHR^6$ | Guanidine |
| ⓟ $-R^5-NR^7-C\begin{subarray}{l}\diagup\!\!\diagup NR^8\\ \diagdown NR^8_2\end{subarray}$ | Guanidine |
| ⓟ $-R^5-NH-C=NAr'$<br>   $\quad\quad\quad\quad\quad\;\; |$<br>   $\quad\quad\quad\quad\quad\;\; NHAr'$ | Guanidine (aromatic) |
| ⓟ $-R^5-O-C=N-R^6$<br>   $\quad\quad\quad\quad\;\; |$<br>   $\quad\quad\quad\quad\;\; NHR^6$ | Isourea |
| ⓟ $-R^5-O-C=N-R^7$<br>   $\quad\quad\quad\quad\;\; |$<br>   $\quad\quad\quad\quad\;\; NH_2$ | Isourea | wherein:
$R^5$ and AR are divalent aliphatic and aromatic organic linking groups, respectively;
ⓟ represents a polyether or hydrocarbon chain or radical, to which said imino ($C=N$) functional group is attached as indicated by the drawings.
$R^6$ is H or a monovalent organic aliphatic group of 1 to 10 carbons;
$R^7$ and $R^8$ are monovalent aliphatic organic groups of 1 to 10 carbon atoms, and
Ar' is a monovalent aromatic organic group of 6 to 18 carbon atoms.

These stated groups are well known in the art. Thus $R_5$ may in particular be propylene, Ar methoxyphenylene, $R_6$ propyl, $R_7$ propyl, $R_8$ propyl and Ar' methoxyphenyl.

It is noted that in the above formulas any two of the three substituents attached to the imino unit can be incorporated as members of a non-aromatic 5 or 6 membered ring. The ring can be carbocyclic or heterocyclic depending, of course, on the particular substituents so incorporated and on whether the carbon or the nitrogen atom (or both) of the imino unit are also incorporated.

When aromatic groups are present in the imino unit it is preferable that they be attached to the carbon atom of said unit and it is most preferred that said aromatic group bear electron donating substituents such as hydroxy, alkoxy N,N-dialkyl-amino etc.

The preparation of these imino functional groups in both cyclic and acyclic forms is well known in the literature. Isoureas are generally prepared by the reaction of an alcohol with a carbodiimide in the presence of a suitable catalyst. The alcohol component may be aliphatic, as described in E. Schmidt, F. Moosmuller, Lieb. Ann. 597, 235, (1956), or aromatic as in E. Vowinkel, Chem. Ber., 96, 1702, (1963). The catalyst employed in these reactions are frequently chloride salts of copper, such as the use of copper (I) chloride in E. Vowinkel, I. Buthe, Chem. Ber., 107, 1353, (1974), or copper (II) chloride, as in E. Schmidt, E. Dabritz, K. Thulke, Lieb. Ann., 685, 161, (1965).

However the reaction can also be carried out by the addition of an alkaline metal to the alcohol component as exemplified by the use of sodium metal in H. G. Khorana, Canad. J. Chem. 32, 261, 1953.

Guanidines can be prepared by the reaction of an amine with a carbodiimide in a manner similar to that outlined in the references cited above.

Alternatively alkylguanidines may be prepared by the reaction of an alkylamine salt with dicyandiamide as in E. A. Werner, J. Bell, J. Chem. Soc., 121, 1790, (1922). In yet another methods-methylthiourea sulphate is combined with an alkylamine as described in "Heterocyclic Chemistry", A. Albert, Althone Press, London, 1968.

A general review of the preparation of imidates is given in "The Chemistry of amidines and imidates", Ed. S. Patai, chapter 9, "Imidates including cyclic imidates", D. G. Neilson, John Wiley, London, 1975. This work includes references to the preparation of the analogous thioimidates. The preparation of acyclic imidates by the combination of an aliphatic or aromatic nitrile with an alcohol under acidic or basic conditions is described in F. C. Schaefer, G. A. Peters, J. Org. Chem., 26, 412, (1961).

The preparation of cyclic imidates, such as oxazolines and dihydro-1,3-oxazines, by the Ritter reaction (addition of 1,3-diols or epoxides to a nitrile under acid catalysts) is described in "Advances in heterocyclic chemistry", Vol. 6, Ed. A. R. Katritzky, A. R. Boulton, Section II.A, "Heterocyclic synthesis involving nitrilium salts and nitriles under acidic conditions", F. Johnson, R. Madronero, Academic Press, New York, 1966 and references therein. In addition this text teaches the preparation of thioimidates such as thiazolines and dihydro-1,3-thiazines. Methods for the preparation of oxazolines and oxazines are also described in U.S. Pat. No. 3,630,996 to D. Tomalia, U.S. Pat. No. 3,640,957 to D. Tomalis and R. J. Thomas, in H. Witte, W. Seeliger, Angew. Chem. Int. Ed., 1972, 287 and in U.S. Pat. No. 3,813,378 to H. Witte and W. Seeliger.

A general review of the preparation of amidines is given in "The Chemistry of amidines and imidates", Ed. S. Patai, chapter 7, "Preparation and synthetic uses of amidines". The general class of five membered ring amidines known as imidazolines can be prepared in a manner similar to that outlined above by the combination of a nitrile containing compound with ethylenediamine in the presence of an acid catalyst. Alternatively these materials can be prepared by the combination of ethylenediamine with carboxylic acids under dehydrating conditions. Other methods for the preparation of these materials include the combination of ethylenediamine with thioamides or with an imino ether hydrochloride. These procedures are described in "The Chemistry of Heterocyclic compounds: Imidazole and its Derivatives", Part I, Ed. A. Weissberger, author K. Hofman, Interscience Publishers, New York, 1953 and references therein. Particularly useful for the preparation of imidazoline terminated softblocks from cyanoethylated polyether polyols would be the method outlined in U.S. Pat. No. 4,006,247 to H. P. Panzer.

The preparation of the homologous tetrahydropyrimidines can be achieved in a similar manner by the use of 1,3-propanediamine as the diamine component. Specific methods are described in "The Chemistry of Heterocyclic Compounds: The Pyrimidines, Supplement I", Ed. A. Weissberger and E. C. Taylor, author D. J. Brown, Interscience Publishers, New York, 1953.

The preparation of an imine can be achieved by any of a number of well documented procedures. In particular, these materials can be obtained by the combination of a primary amine with an aldehyde or a ketone under dehydrating conditions. This and numerous alternative methods are contained in "The Chemistry of the Carbon-Nitrogen Double Bond", Ed. S. Patai, Interscience Publishers, London, 1970 and references therein.

Enamine-containing compounds which may be present in Component B include compounds having the structures

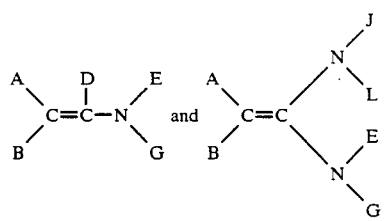

wherein each of A, B, D, E, G, J and L, independently, represents hydrogen or an optionally substituted hydrocarbon radical, any of A, B and D and, independently, any of E, G, J and L optionally being joined together to form one or more carbocyclic or heterocyclic rings.

In many preferred enamino-functional compounds, E, G, J and L are not hydrogen. It is also preferred that not both of A and B are hydrogen. Especially useful enamino-functional compounds contain two or more enamino groups as a result of any of A, B, D, E, G, J and/or L being a radical terminating in one or more enamino groups.

Preferred enamino-functional compounds include enamino-functional polyether resins having molecular weights of at least 1000, preferably 2000 to 8000 and an average enamine functionality of at least 1.1, preferably from about 2 to about 4.

Suitable enamino-functional compounds may be obtained in known manner by reacting a carbonyl compound containing at least one alpha-hydrogen atom, for example an aliphatic, cyclo-aliphatic or araliphatic aldehyde or ketone such as acetaldehyde, propionaldehyde, isobutyraldehyde, caproaldehyde, cyclohexyl aldehyde, acetone, methyl ethyl ketone, benzyl methyl ketone, cyclopentanone, cyclohexanone, trimethylcyclohexanone, mixtures of these and the like with a secondary amine, for example a secondary amino-terminated polymer such as a polyether.

General techniques for the synthesis of enamines have been described in, for example, Org. Coatings and Plastics Chem., 44, 151 and 157, (1981), ACS-PMSE preprints, Aug./Sept. 1983, 456 and 461, and U.S. Pat. Nos. 4,342,841 and 4,552,945.

Polyols having equivalent weights below 500 which may be present as chain extenders in the B Components of the reaction systems of the invention include simple non-polymeric diols such as ethylene glycol and 1,4-butanediol.

Polyamines having equivalent weights below 500 which may be used as chain extenders include aliphatic, cycloaliphatic or araliphatic polyamines containing two or more primary and/or secondary amino groups and, especially, aromatic polyamines.

Aromatic polyamines useful as chain extenders in the reaction systems of the invention particularly include diamines, especially those having molecular weights from about 100 to about 400, preferably between 122 and 300. Suitable diamines have been fully described in the prior art and include 3,5-diethyl-2,4-toluenediamine, 3,5-diethyl-2,6-toluenediamine, DETDA which is a mixture of about 80% by weight of 3,5-diethyl-2,4-toluenediamine and about 20% by weight of 3,5-diethyl-2,6-toluenediamine, 1,3,5-triethyl-2,6-diaminobenzene, 2,4-diaminotoluene, 2,6-diaminotoluene, 2,4'-diaminodiphenylmethane, 4,4'-diaminodiphenylmethane, 3,3'-dimethyl-5,5'-diethyl-4,4'-diaminodiphenylmethane, 3,3',5,5'-tetraisopropyl-4,4'-diaminodiphenylmethane and the like and mixtures thereof.

Imino-functional and/or enamine-containing compounds suitable as chain extenders typically have molecular weights below 1000, especially between about 100 and about 600 and functionalities between 1 and 3, preferably 1 to 2. In other respects, for example structure and functionality, they may have the characteristics of the higher molecular weight imino-functional or enamine-containing compounds described above.

Examples of preferred imino-functional compounds for use as chain extenders in the reaction systems of the invention include simple aldimines and/or ketimines such as may be obtained by reacting aldehydes, for example formaldehyde, acetaldehyde, propionaldehyde, n-butyraldehyde, isobutyraldehyde, heptaldehyde, alpha-methylvaleraldehyde, β-methylvaleraldehyde, caproaldehyde, isocaproaldehyde or cyclohexyl aldehyde and mixtures thereof or ketones, for example acetone, methyl ethyl ketone, methyl n-propyl ketone, methyl isopropyl ketone, diethyl ketone, benzyl methyl ketone or cyclo-hexanone and mixtures thereof with primary amines, especially aliphatic diamines. Examples of suitable amines include hexamethylene diamine, menthane diamine, isophorone diamine, xylylene diamine, 2-methylpentamethylene diamine, polyoxyalkylene diamines and/or triamines and mixtures of such amines. Primary mono-amines may also be used either alone or together with diamines.

Examples of suitable enamine-containing chain extenders are described in U.S. Pat. Nos. 4,342,841 and 4,552,945. Other examples include the bis-enamines formed by reacting piperazine with simple carbonyl compounds such as acetone, methyl ethyl ketone, cyclohexanone and the like.

Particularly valuable reaction systems for use in the RIM process comprise:

(A) a polyisocyanate composition which is the product of reacting an alcohol and/or thiol having an average hydroxyl and/or thiol functionality of from about 1.5 to about 4 and an average hydroxyl and/or thiol equivalent weight of at least 500 with at least 2 equivalents, per hydroxyl and/or thiol equivalent, of an organic polyisocyanate under such conditions that at least about 20% of the initially formed urethane and/or thiourethane groups are converted to allophanate (B) an isocyanate-reactive composition comprising:
(i) a chain extender comprising:
(a) 0–100% of an aromatic polyamine having an aromatically bound primary and/or secondary amine functionality of from about 1.8 to about 3.0, an average molecular weight of from about 100 to about 400 and wherein at least 50 mole per cent of the species comprising said polyamine are diamines, and, correspondingly, (b) 100–0% of an imino- and/or enamino-functional aliphatic compound having from about 1 to about 3 isocyanate-reactive imino and/or enamine groups per molecule and a molecular weight less than 1000, and
(ii) an imino- and/or enamino-functional polyether having an average of from about 1.1 to about 5 isocyanate-reactive imino and/or enamine groups per molecule and an average molecular weight of from 1000 to about 10,000 and wherein said imino and/or enamine groups constitute at least 50 mole per cent of the isocyanate-reactive groups in said polyether and at least 50 mole per cent of said imino- and/or enamino-functional polyether species contain 2 or more imino and/or enamine groups per molecule.

The reaction systems of the present invention may further contain other conventional ingredients of such systems such as internal mould release agents, catalysts, surfactants, blowing agents, fillers (which may be reinforcements), plasticizers, fire retardants, coupling agents, and the like.

Suitable internal mold release agents include, for example, copper stearate, zinc stearate and a dimethyl polysiloxane with organic acid groups which is commercially available as Dow-Corning Q2-7119 from Dow-Corning Corporation. Other organo-polysiloxanes bearing organic hydroxyl groups (instead of acids) can also be used. A specific example of a very effective, hydroxy functional, polysiloxane internal mold release additive is L-412T (available from Goldschmidt AG. The amount of internal mold release agent used can be from about 0.001 to about 5.0 percent by weight of the total reactants (i.e. total polymer).

Catalysts are generally not required during the preparation of polyureas by RIM. Catalysts may, however, be used if desired. Suitable catalysts include, for example, tertiary amines or organotin compounds, such as dibutyltin dilaurate, dibutyltin diacetate, diethyltin diacetate, dihexyltin diacetate, di-2-ethylhexyltin oxide, stannous octoate, stannous oleate, or a mixture thereof. Tertiary amine catalysts include trialkylamines which include, for example, triethylamine; heterocyclic amines such as N-alkylmorpholines which include, for example, N-methylmorpholine, N-ethylmorpholine; 2,2'-bis(dimethylamino)diethyl ether; 1,4-dimethylpiperazine, triethylenediamine, and aliphatic polyamines such as N,N, N',N'-tetramethyl-1,3-butanediamine, or alkanolamines such as N-methyl diethanolamine. The amount of catalyst used will generally be less than about 5 percent by weight of the total reactants, preferably less than 1%. Combinations of tertiary amine and organotin catalysts are frequently used in the art. Isocyanurate catalysts, such as alkali and/or alkaline earth metal salts of carboxylic acids, may also be added to the formulations of the invention.

Suitable surfactants include, for example, sodium salts of castor oil sulfonates; alkali metal or ammonium salts of sulfonic acids such as dodecyl benzene sulfonic acid; and polyether siloxanes having a structure such that a copolymer of ethylene oxide and propylene oxide is attached to a polydimethyl siloxane radical. The amount of surfactant used is less than about 2 percent by weight of the total reactants, preferably less than 1%.

Suitable blowing agents include, for example, dissolved or dispersed gases such as air, $CO_2$, $N_2O$, or nitrogen, and low boiling halogenated hydrocarbons such as methylene chloride and trichloromonofluoromethane. The amount of blowing agent used is preferably less than about 4 percent by weight of the total reactants.

Suitable fillers include fiberglass reinforcement fibers, particularly those having lengths of from about 1/16 inch (0.16 cm) to about ½ inch (1.27 cm) and milled glass fibers having a length of 1/16 inch (0.16 cm), ⅛ inch (0.32 cm) or ¼ inch (0.64 cm) and the like. Shorter fibers are always preferred for ease of processing when they are incorporated as part of the "A" or "B" component streams.

Other particularly suitable fillers are mica, fumed silica, flake glass, Wollastonite, calcium carbonate, carbon black, and the like.

The products of the present invention can be shaped into useful articles such as automobile fascias, or panels, by the reaction injection molding (RIM) process, which is performed in a RIM machine.

RIM machines are well known in the art and include those supplied by Admiral Equipment Corp., Akron, Ohio by Cincinnati Milacron Corp., Cincinnati, Ohio, by Battenfeld GmbH, Meinerzhagen, West Germany and by Krauss-Maffei GmbH, West Germany.

The reagents may be blended in a suitable container and agitated at a temperature from about 20° C. to about 100° C. It is preferred to mix and process the ingredients of component (B) at or near ambient (20° C.) temperature.

The "A" and "B" Components are placed in separate containers, which are generally equipped with agitators, of the RIM machine wherein the temperature of the "A" Component is 20° C. to about 125° C. It is preferred that the isocyanate temperature used for processing and mixing be below about 50° C., particularly if the isocyanate contains a catalyst or latent catalyst for the imine-isocyanate reaction. The temperature of the "B" Component can be between about 20° C. to about 80° C., but is preferably about 20° C. to about 40° C.

The "A" Component and "B" Component are impingement mixed in a forced mix head such as, for example, a Krauss-Maffei mix head. The "A" and "B" Components are pumped to the mix head by a metering pump, for example, a Viking Mark 21A, at a discharge pressure from about 700 to about 5000 psi. It is sometimes necessary to maintain the component streams (A and B) within the pistons (or pumps), mix head, and all conduits connecting these components, at temperatures comparable to those which prevail within the storage tanks. This is often done by heat-tracing and/or by independent recirculation of the components.

The amounts of the "A" and the "B" Components pumped to the mix head is measured as the ratio by weight of the "A" Component to the "B" Component wherein the ratio is from about 9:1 to about 1:9, preferably from 3:1 to 1:3, depending upon the reactants used and the isocyanate index desired. It is preferred that a weight ratio be employed which yields a ratio of isocyanate equivalents in stream (A) to isocyanate-reactive functional groups in stream (B) between 0.70 and 1.90, preferably 0.90 to 1.30, more preferably 0.95 to 1.20. This ratio of equivalents is known as the index and is often expressed as a percentage. The expression "isocyanate-reactive-functional-groups" are defined herein to include imine groups, primary and/or secondary amine groups (aromatic or aliphatic), hydroxyl groups, enamine groups, ketene aminal groups, mercapto(-SH) groups and carboxylic acids, said groups being organically bound.

Either or both streams may contain up to 40% of its weight in solid fillers or reinforcements. In a preferred embodiment, each stream contains at least 70% by weight of reactive species, not more than 30% by weight of fillers and/or reinforcements, and not more than 10% of other optional additives.

The impingement mixed blend of "A"/"B" streams is injected into a mold at a velocity from about 0.3 lb./sec. to about 70 lb./sec., preferably 5 to 20 lb./sec. The mold is heated to a temperature from about 20° C. to 250° C. Suitable molds are made of metal such as aluminum or steel, although other materials can be used if they can withstand the processing conditions and wear. Usually an external mold release agent is applied before the first molding. These are usually soaps or waxes which are solid at the mold temperature employed.

A molded polymer article is formed after the impingement mixture is in the mold from about 1 second to about 30 seconds, preferably 5 to 20 seconds. The mold is then opened and the molded product is removed from the mold. The molded product may be post cured by placing the product in an oven having a temperature between 50° C. and about 250° C. for a time from about one-half hour to about 3 hours.

Although not essential to the successful practice of this invention, it is within the scope of the invention to incorporate reactive ingredients into the reaction systems of the invention, in minor amounts, which are different from the types of reactants specifically described herein.

The individual components of the reaction systems are desirably stored and processed under an inert atmosphere such as dry air or nitrogen.

The formulations of the invention are processed at an isocyanate index between 0.70 and 1.90, preferably between 0.95 and 1.20; with the proviso that, if a catalyst for the conversion of isocyanate to isocyanurate groups is present, the index may extend up to about 15. Examples of suitable isocyanurate catalysts include alkali metal salts of carboxylic acids, for example, potassium 2-ethylhexoate.

The polyisocyanate compositions of the invention may also be reacted with isocyanate-reactive components, for example polyols, in the presence of the usual blowing agents, catalysts, surfactants and the like to form foams having densities of from 10 to 400 kg/m$^3$.

The invention is illustrated but not limited by the following Examples in which all parts, percentages and ratios are by weight unless otherwise indicated. In the Examples, Flexural Modulus was determined by ASTM D790; Impact (falling weight) was determined by ASTM D3029-84.

EXAMPLE 1

Prepolymer 1 was prepared by reacting 43.9 parts of polypropylene glycol 2000 with 56.1 parts of an 80/20 mixture of 4,4'- and 2,4'-diphenylmethane diisocyanates in the presence of 0.002 part of dibutyltin dilaurate at 115° C. for 2 hours. The allophanate containing prepolymer so obtained had an NCO content of 14.1%.

EXAMPLE 2

A series of elastomer products were prepared on a Battenfeld SHK-65 machine, by reacting the prepolymer of example 1 with a number of "B" components, using the RIM technique. As "B" components use was made of the following Amine composition A:
40 pbw of Jeffamine* D 2000
10 pbw of Jeffamine* D 400
50 pbw of DETDA Imine composition B:
40 pbw of the cyclohexanone imine of Jeffamine* T 5000
15 pbw of the cyclohexanone imine of Jeffamine* D 400
45 pbw of DETDA Imine composition C:
70 pbw of the cyclohexanone imine of Jeffamine* T 5000
30 pbw of DETDA

*"Jeffamine" is a trade mark for polyether diamines and triamines marketed by Texaco.

The relative amounts of prepolymers ("A" Component) and isocyanate reactive compositions ("B" Component) as stated in the following Table 1A. The temperature of the mold was maintained at approximately 90° C. The properties of the elastomer products thus obtained are indicated in the following Table 1B.

TABLE I

Preparation of elastomer products by the RIM technique

| Example No. | 2a | 2b | 2c |
|---|---|---|---|
| A: Amounts of "A" and "B" Components | | | |
| Component "A" (parts by weight) | prepolymer 1 204 | prepolymer 1 223 | prepolymer 1 183 |
| Component "B" (parts by weight) | Amine comp. A 100 | Amine comp. A 100 | Imine comp. B 100 |
| B: Properties of the elastomer products obtained | | | |
| Density (kg/m³) | 1131 | 1138 | 1134 |
| Flexural Modulus (MPa) | 763 | 709 | 657 |
| Hardness (Shore D) | 71 | 71 | 70 |
| Tensile Strength (kPa) | 32703 | 29371 | 29857 |
| Elongation at break (%) | 117 | 117 | 107 |
| Impact at 20° C. (J) | 68 | 48 | 50 |
| at −20° C. (J) | 54 | 48 | 50 |

| Example No. | 2d | 2e | 2f |
|---|---|---|---|
| A: Amounts of "A" and "B" Components | | | |
| Component "A" (parts by weight) | prepolymer 1 200 | prepolymer 1 129 | prepolymer 2 119 |
| Component "B" (parts by weight) | Imine comp. B 100 | Imine comp. C 100 | Imine comp. C 100 |
| B: Properties of the elastomer products obtained | | | |
| Density (kg/m³) | 1137 | 1125 | 1110 |
| Flexural Modulus (Eflex MPa) | 636 | 402 | 381 |
| Hardness (Shore D) | 69 | 65 | 66 |
| Tensile Strength (kPa) | 28300 | 23111 | 23900 |
| Elongation at break (%) | 93 | 135 | 153 |
| Impact at 20° C. (J) | 70 | 83 | 66 |
| at −20° C. (J) | 51 | 60 | 64 |

We claim:

1. A polyisocyanate composition which is the product of reacting an alcohol and/or thiol having an average hydroxyl and or thiol functionality of from about 1.5 to about 4 and an average hydroxyl and/or thiol equivalent weight of at least 500 with at least 2 equivalents, per hydroxyl and/or thiol equivalent, of an organic polyisocyanate under such conditions that at least about 20% of the initially formed urethane and/or thiourethane groups are converted to allophanate and/or thioallophanate groups.

2. A polyisocyanate composition according to claim 1 wherein at least 50% of the initially formed urethane and/or thiourethane groups are converted to allophanate and/or thioallophanate groups.

3. A polyisocyanate composition according to claim 1 containing at least two groups of the formula:

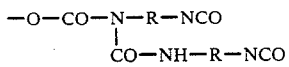

wherein R represents a divalent hydrocarbon radical, said groups being separated one from another by a chain of more than 70 atoms.

4. A polyisocyanate composition according to claim 3 wherein said groups are separated one from another by a chain of more than 100 atoms.

5. A polyisocyanate composition according to claim 1 wherein the organic polyisocyanate reacted with the alcohol and/or thiol comprises a diphenylmethane diisocyanate.

6. A polyisocyanate composition according to claim 1 wherein the alcohol reacted with the organic polyisocyanate comprises a polymeric polyol having an average nominal hydroxyl functionality of from 2 to 5 and an average hydroxyl equivalent weight in the range from 500 to 5000.

7. A polyisocyanate composition according to claim 6 wherein the polymeric polyol has an average nominal hydroxyl functionality of 2 or 3 and an average hydroxyl equivalent weight in the range from about 1000 to about 3000.

8. A polyisocyanate composition according to claim 6 wherein the polymeric polyol is a polyether polyol.

9. A polyisocyanate composition according to claim 8 wherein the polyether polyol is a polyoxypropylene diol or triol or a poly(oxyethylene-oxypropylene) diol or triol.

10. A reaction system for use in making a reaction injection moulded elastomer, said system comprising the following components:

(A) a polyisocyanate composition which is the product of reacting an alcohol and/or thiol having an average hydroxyl and/or thiol functionality of from about 1.5 to about 4 and an average hydroxyl and/or thiol equivalent weight of at least 500 with at least 2 equivalents, per hydroxyl and/or thiol equivalent, of an organic polyisocyanate under such conditions that at least about 20% of the initially formed urethane and/or thiourethane groups are converted to allophanate and/or thioallophanate groups, and (B) an isocyanate-reactive component.

11. A reaction system for use in the production of foams having densities of from 10 to 400 kg/m³, said system comprising:

A) a polyisocyanate composition as defined in claim 1,
B) an isocyanate-reactive component, and
C) a blowing agent.

12. A reaction system according to claim 10 wherein the isocyanate-reactive component comprises an aromatic polyamine.

13. A reaction system according to claim 10 comprising:

(A) a polyisocyanate composition which is the product of reacting a alcohol and/or thiol having an average hydroxyl and/or thiol functionality of from about 1.5 to about 4 and an average hydroxyl and/or thiol equivalent weight of at least 500 with at least 2 equivalents, per hydroxyl and/or thiol equivalent, of an organic polyisocyanate under such conditions that at least about 20% of the initially formed urethane and/or thiourethane groups are converted to allophanate and/or thioallophanate groups, and (B) an isocyanate-reactive composition comprising:
  (i) an aromatic polyamine chain extender having an aromatically bound primary and/or secondary amine functionality of from about 1.8 to about 3.0, an average molecular weight of from about 100 to about 400 and wherein at least 50 mole per cent of the species comprising said polyamine are diamines, and, correspondingly,
  (ii) an amino-, imino-, enamino- and/or hydroxyl-functional polyether having an average of from about 1.1 to about 5 isocyanate-reactive groups per molecule and an average molecular weight of from 1500 to about 10,000.

14. A reaction system according to claim 10 comprising:
(A) a polyisocyanate composition which is the product of reacting an alcohol and/or thiol having an average hydroxyl and/or thiol functionality of from about 1.5 to about 4 and an average hydroxyl and/or thiol equivalent weight of at least 500 with at least 2 equivalents, per hydroxyl and/or thiol equivalent, of an organic polyisocyanate under such conditions that at least about 20% of the initially formed urethane and/or thiourethane groups are converted to allophanate and/or thioallophanate groups, and
(B) an isocyanate-reactive composition comprising:
  (i) a chain extender comprising:
    (a) 0–100% of an aromatic polyamine having an aromatically bound primary and/or secondary amine functionality of from about 1.8 to about 3.0, an average molecular weight of from about 100 to about 400 and wherein at least 50 mole per cent of the species comprising said polyamine are diamines, and, correspondingly,
    (b) 100–0% of an imino- and/or enamino-functional aliphatic compound having from about 1 to about 3 isocyanate-reactive imino and/or enamine groups per molecule and a molecular weight less than 1000, and
  (ii) an imino- and/or enamino-functional polyether having an average of from about 1.1 to about 5 isocyanate-reactive imino and/or enamine groups per molecule and an average molecular weight of from 1000 to about 10,000 and wherein said imino and/or enamine groups constitute at least 50 mole per cent of the isocyanate-reactive groups in said polyether and at least 50 mole per cent of said imino- and/or enamino-functional polyether species contain 2 or more imino and/or enamine groups per molecule.

15. A reaction system according to claim 11 wherein the isocyanate-reactive component comprises an aromatic polyamine.

16. A reaction system according to claim 11 comprising:

(A) a polyisocyanate composition which is the product of reacting an alcohol and/or thiol having an average hydroxyl and/or thiol functionality of from about 1.5 to about 4 and an average hydroxyl and/or thiol equivalent weight of at least 500 with at least 2 equivalents, per hydroxyl and/or thiol equivalent, of an organic polyisocyanate under such conditions that at least about 20% of the initially formed urethane and/or thiourethane groups are converted to allophanate and/or thioallophanate groups, and (B) an isocyanate-reactive composition comprising:
  (i) an aromatic polyamine chain extender having an aromatically bound primary and/or secondary amine functionality of from about 1.8 to about 3.0, an average molecular weight of from about 100 to about 400 and wherein at least 50 mole per cent of the species comprising said polyamine are diamines, and, correspondingly,
  (ii) an amino-, imino-, enamino- and/or hydroxyl-functional polyether having an average of from about 1.1 to about 5 isocyanate-reactive groups per molecule and an average molecular weight of from 1500 to about 10,000.

17. A reaction system according to claim 11 comprising:
(A) a polyisocyanate composition which is the product of reacting an alcohol and/or thiol having an average hydroxyl and/or thiol functionality of from about 1.5 to about 4 and an average hydroxyl and/or thiol equivalent weight of at least 500 with at least 2 equivalents, per hydroxyl and/or thiol equivalent, of an organic polyisocyanate under such conditions that at least about 20% of the initially formed urethane and/or thiourethane groups are converted to allophanate and/or thioallophanate groups, and
(B) an isocyanate-reactive composition comprising:
  (i) a chain extender comprising:
    (a) 0–100% of an aromatic polyamine having an aromatically bound primary and/or secondary amine functionality of from about 1.8 to about 3.0, an average molecular weight of from about 100 to about 400 and wherein at least 50 mole per cent of the species comprising said polyamine are diamines, and, correspondingly,
    (b) 100–0% of an imino- and/or enamino-functional aliphatic compound having from about 1 to about 3 isocyanate-reactive imino and/or enamine groups per molecule and a molecular weight less than 1000, and
  (ii) an imino- and/or enamino-functionality polyether having an average of from about 1.1 to about 5 isocyanate-reactive imino and/or enamine groups per molecule and an average molecular weight of form 1000 to about 10,000 and wherein said imino and/or enamine groups constitute at least 50 mole per cent of the isocyanate-reactive groups in said polyether and at least 50 mole per cent of said imino- and/or enamino-functional polyether species contain 2 or more imino and/or enamine groups per molecule.

* * * * *